(12) United States Patent
Cheng et al.

(10) Patent No.: US 6,405,309 B1
(45) Date of Patent: Jun. 11, 2002

(54) METHOD AND APPARATUS FOR CREATING AND DEPLOYING SMALLER MICROSOFT WINDOWS APPLICATIONS FOR AUTOMATIC CONFIGURATION OF A COMPUTING DEVICE

(75) Inventors: Cheuk Cheng, Daly City; Bing Yuan; Jean-Paul Abgrall, both of San Jose, all of CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,108

(22) Filed: Jun. 18, 1999

(51) Int. Cl.⁷ .............................................. G06F 9/445
(52) U.S. Cl. .................................................. 713/1
(58) Field of Search ........................... 713/1, 2; 717/11

(56) References Cited

U.S. PATENT DOCUMENTS

| | | |
|---|---|---|
| 5,121,345 A | 6/1992 | Lentz |
| 5,128,995 A | 7/1992 | Arnold et al. |
| 5,131,089 A | 7/1992 | Cole |
| 5,142,680 A | 8/1992 | Ottman et al. |
| 5,146,568 A | 9/1992 | Flaherty et al. |
| 5,214,695 A | 5/1993 | Arnold et al. |
| 5,274,816 A | 12/1993 | Oka |
| 5,280,627 A | 1/1994 | Flaherty et al. |
| 5,307,497 A | 4/1994 | Feigenbaum et al. |
| 5,325,532 A | 6/1994 | Crosswy et al. |
| 5,379,431 A | 1/1995 | Lemon et al. |
| 5,381,549 A | 1/1995 | Tamura |
| 5,418,918 A | 5/1995 | Vander Kamp et al. |
| 5,444,850 A | 8/1995 | Chang |
| 5,448,741 A | 9/1995 | Oka |
| 5,452,454 A | 9/1995 | Basu |
| 5,463,766 A | 10/1995 | Schieve et al. |
| 5,469,573 A | 11/1995 | McGill, III et al. |
| 5,504,905 A | 4/1996 | Cleary et al. |
| 5,522,076 A | 5/1996 | Dewa et al. |
| 5,526,523 A | 6/1996 | Straub et al. |
| 5,542,082 A | 7/1996 | Solhjell |
| 5,581,740 A | 12/1996 | Jones |
| 5,586,327 A | 12/1996 | Bealkowski et al. |
| 5,594,903 A | 1/1997 | Bunnell et al. |
| 5,604,890 A | 2/1997 | Miller |
| 5,652,868 A | 7/1997 | Williams |
| 5,652,886 A | 7/1997 | Tulpule et al. |
| 5,664,194 A | 9/1997 | Paulsen |
| 5,680,547 A | 10/1997 | Chang |
| 5,692,190 A | 11/1997 | Williams |
| 5,694,583 A | 12/1997 | Williams et al. |
| 5,694,600 A | 12/1997 | Khenson et al. |
| 5,701,477 A | 12/1997 | Chejlava, Jr. |
| 5,715,456 A | 2/1998 | Bennett et al. |
| 5,717,930 A | 2/1998 | Imai et al. |
| 5,727,213 A | 3/1998 | Vander Kamp et al. |
| 5,732,268 A | 3/1998 | Bizzarri |
| 5,748,957 A | 5/1998 | Klein |
| 5,754,853 A | 5/1998 | Pearce |
| 5,764,593 A | 6/1998 | Turpin et al. |
| 5,781,758 A | 7/1998 | Morley |
| 5,790,849 A | 8/1998 | Crocker et al. |
| 5,796,984 A | 8/1998 | Pearce et al. |
| 5,802,363 A | 9/1998 | Williams et al. |
| 5,805,880 A | 9/1998 | Pearce et al. |
| 5,805,882 A | 9/1998 | Cooper et al. |
| 5,815,706 A | 9/1998 | Stewart et al. |
| 5,819,063 A | 10/1998 | Dahl et al. |
| 5,828,888 A | 10/1998 | Kozaki et al. |
| 5,832,251 A | 11/1998 | Takahashi |
| 5,842,011 A | 11/1998 | Basu |
| 5,854,905 A | 12/1998 | Garney |
| 5,864,698 A | 1/1999 | Krau et al. |
| 5,887,164 A | 3/1999 | Gupta |
| 5,901,310 A | 5/1999 | Rahman et al. |
| 5,907,679 A | 5/1999 | Hoang et al. |

Primary Examiner—Thomas M. Heckler

(57) ABSTRACT

A method including creating an executable program in accordance with a Windows Control Panel Language (CPL) format; storing the executable program in a first non-volatile memory; transferring the executable program from the first non-volatile memory to a second non-volatile memory; and, configuring an operating system to start-up the executable program after the operating system has completed booting.

24 Claims, 8 Drawing Sheets

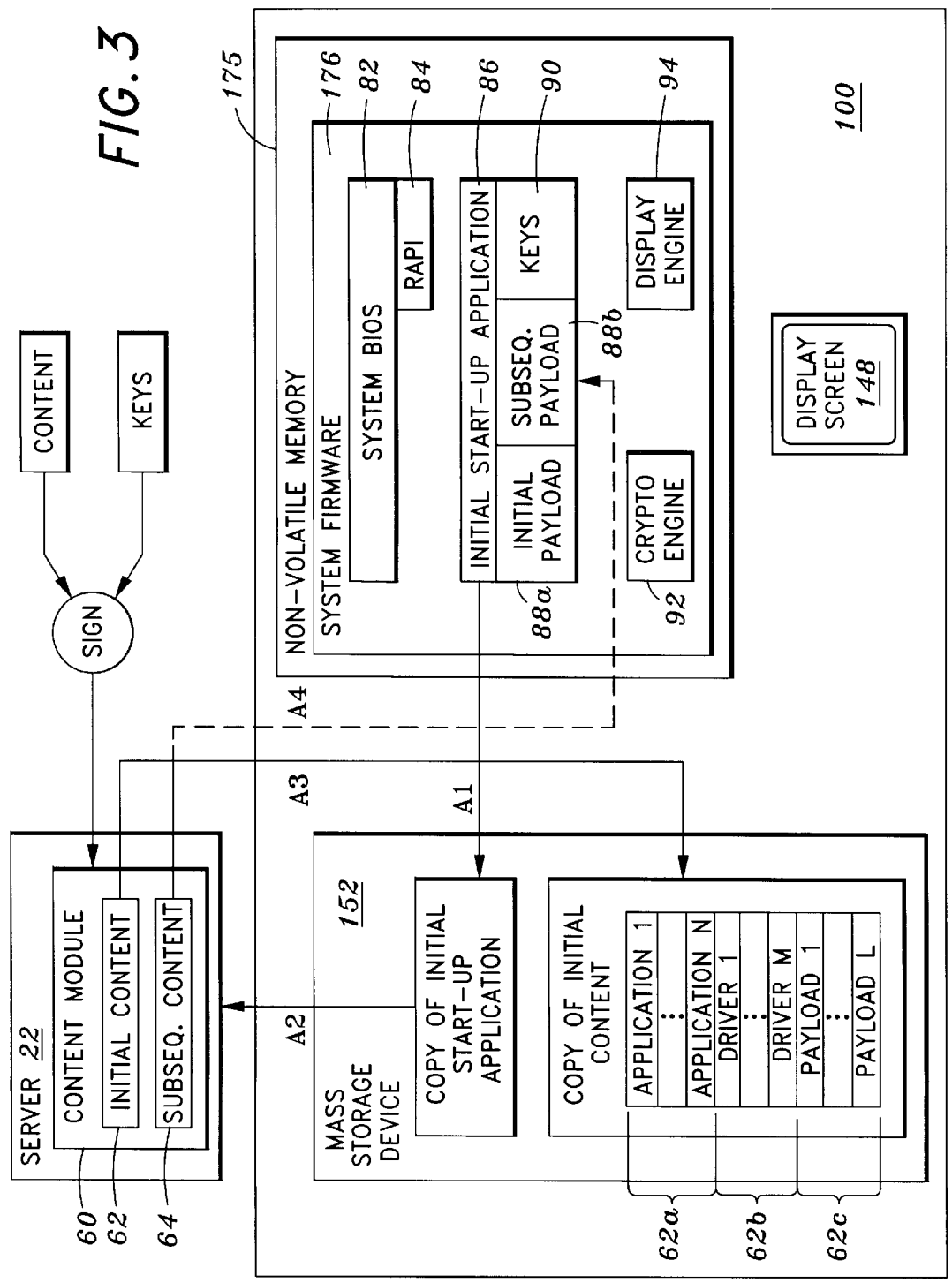

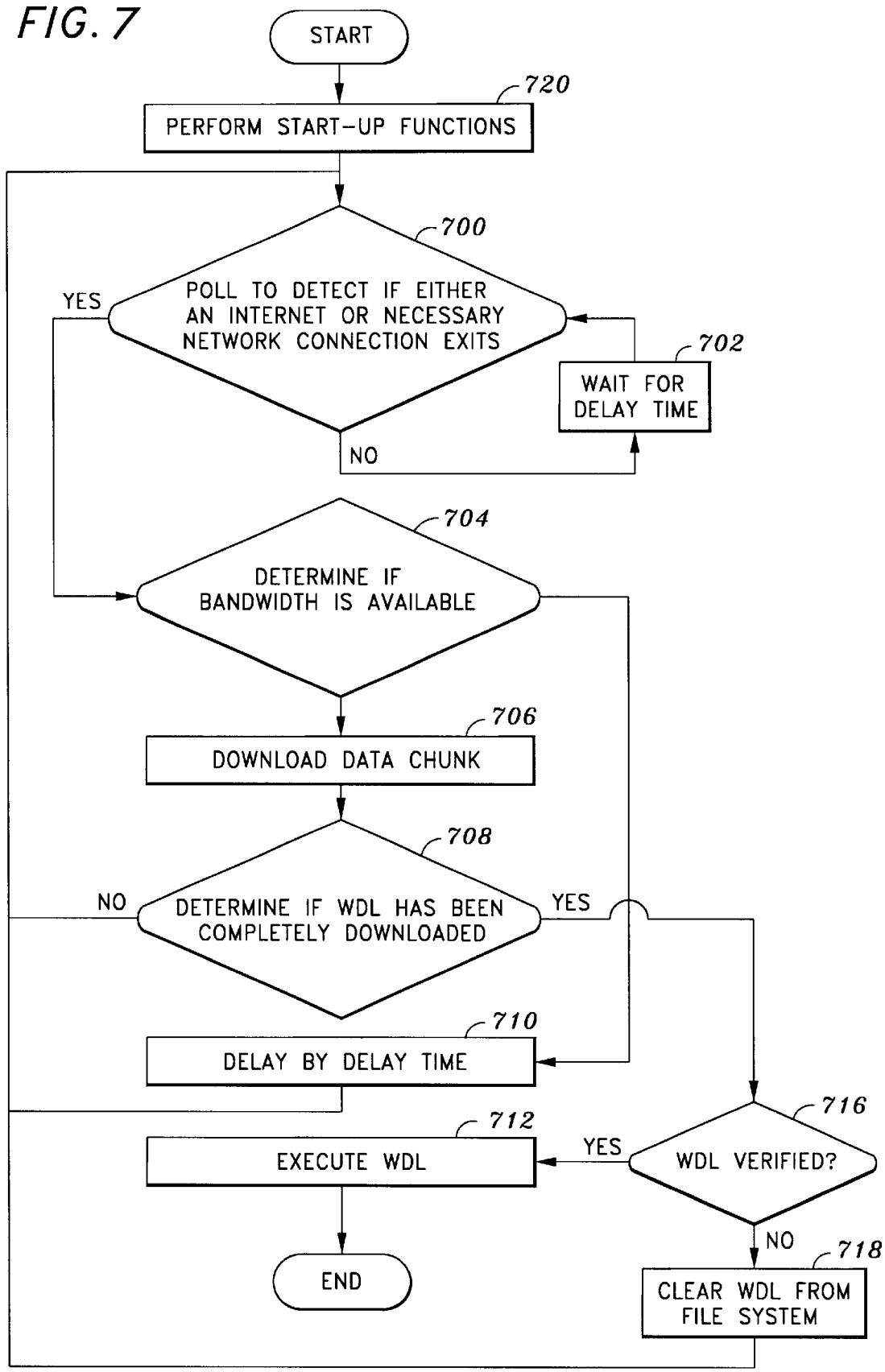

METHOD AND APPARATUS FOR CREATING AND DEPLOYING SMALLER MICROSOFT WINDOWS APPLICATIONS FOR AUTOMATIC CONFIGURATION OF A COMPUTING DEVICE

FIELD OF THE INVENTION

This invention relates to the reduction of executable program sizes. Specifically, this invention describes a method and apparatus for creating and deploying smaller Microsoft Windows applications for automatic configuration of a computer device.

DESCRIPTION OF RELATED ART

The increasing use of computers in collecting and distributing information has revealed various problems with the typical collection and distribution channels. For example, one current software distribution system enables the software vendor to provide a number of users with software over a network. The system also enables the vendor to update and maintain the software at the request of the users and to enable the users to acquire software at the users' requests from different software vendors over the network. However, such a system only provides software and related services at the request of the user, without considering the user's requirements or preferences. As a result, the system is not optimized for the user's specific needs and/or preferences.

Normally, computer systems are shipped to users without any bundled software. When computer manufacturers want to add software packages to increase a system's perceived end-user value, increased configuration time and expense is created as each additional software package must be installed and tested during the assembly process of the system. To save time, a manufacturer might pre-configure such components of a system such as the hard disk drive. However, the manufacturer must be concerned with inventory costs and wasted configuration time if a change is necessary in the installed software.

One possible solution would be to include software on a separate media such as floppy discs or optical discs (CD-ROM or DVD-ROM). This additional software may then be installed by the user onto the computer system. However, this solution would require the user to spend time installing the software, and create additional customer support issues if the user cannot install the software correctly. In addition, the user may choose not to install one or more of the applications intended for installation by the manufacturer, such as demonstration software or other software used for advertising.

One other possible solution might be possible for the manufacturer to place software in the computer system that automatically loads at the start-up of the computer and then installs additional applications. The software may unobtrusively download the additional applications from a network, and install them. Also, the software must be as small as possible to minimize use of the resources of the computer hardware.

Currently, the smallest executable programs obtainable under the 32-bit versions of the operating systems marketed by Microsoft Corporation (e.g., Windows 95™, Windows 98™, and Windows NT™, collectively referred to as "Window"), is approximately 8 kilobytes (K) in size when compiled using a compiler such as Visual C++, Version 5, marketed by Microsoft Corporation. However, this is assuming no functionality and with all debugging support removed. Thus, to obtain any functionality or provide debugging capabilities, the size of the program would be increased. Although the size of the compiled application varies depending on factors such as the specific compiler used and the file type, even the smallest achievable compiled size for an application is still comparably large.

Given the requirements of having a Windows application of less than the minimum size currently obtainable by using the executable program format, and be able to start up automatically at Windows startup without modifying the Windows system registry, the standard Windows executable file format cannot be used.

Accordingly, there is a need in the technology for a method and apparatus for creating smaller Microsoft Windows applications that is executable at start-up and does not require the modification of Windows to be compatible.

SUMMARY OF THE INVENTION

A method including creating an executable program in accordance with a Windows Control Panel Language (CPL) format; storing the executable program in a first non-volatile memory; transferring the executable program from the first non-volatile memory to a second non-volatile memory; and, configuring an operating system to start-up the executable program after the operating system has completed booting.

BRIEF DESCRIPTION OF THE DRAWINGS

FIG. 3 illustrates a block diagram detailing portions of one embodiment of the information distribution system of FIG. 1.

FIG. 7 illustrates a flow diagram detailing one example of the operations of the smaller Microsoft Windows application performed in accordance with the principles of the invention.

DETAILED DESCRIPTION

Definitions

Figure 1:
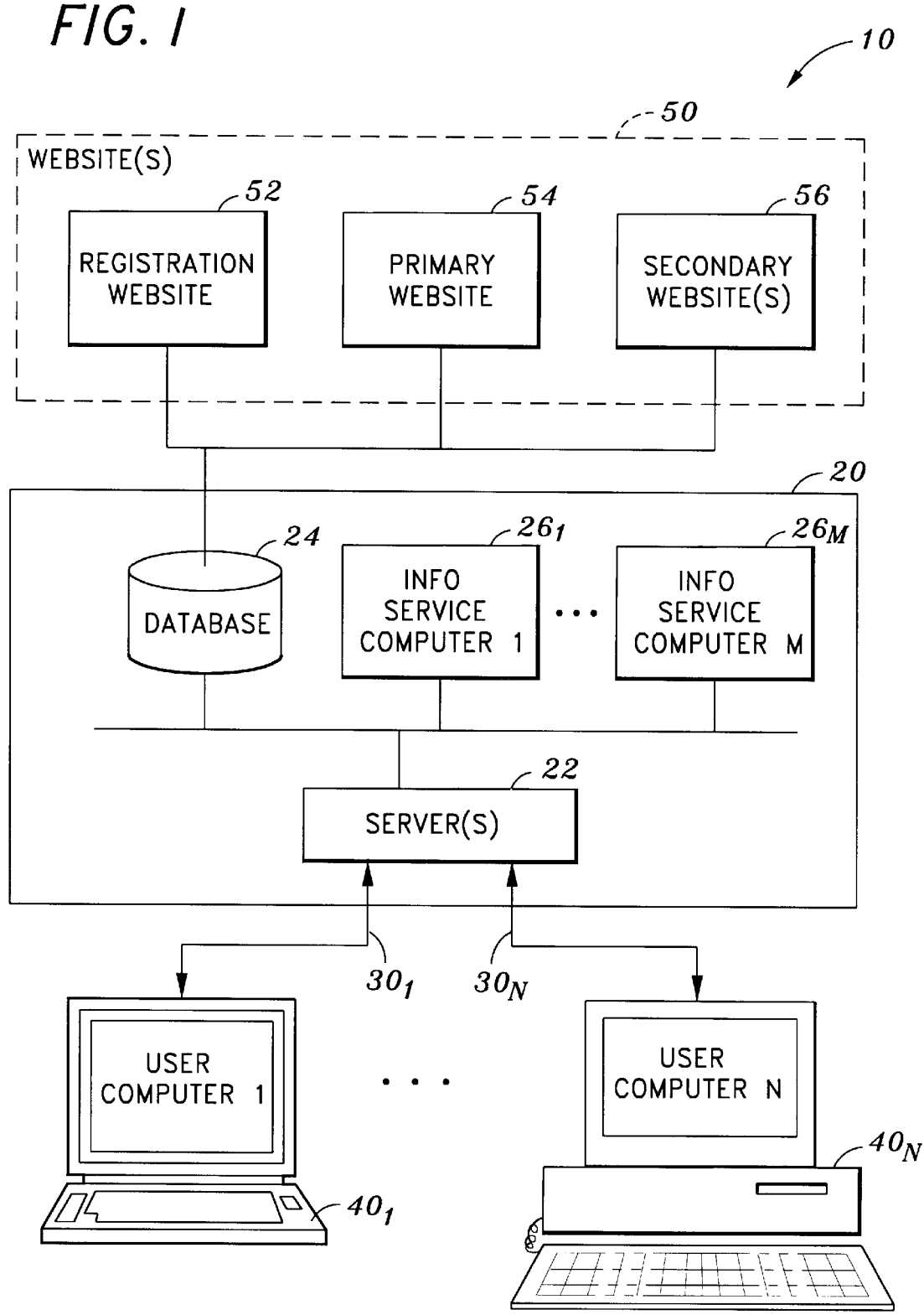
FIG. 1 is a system block diagram of one embodiment of an information distribution system in which the apparatus and method of the invention is used.

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins.

OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

The present invention provides a solution to get around the size limitation of the Microsoft Windows ("Windows") executable program by adopting the Windows Control Panel Library (CPL) format for the creating a smaller Windows application while making no alternations to the Windows system. The CPL file format has a structure similar to a standard Windows Dynamic Link Library (DLL) file with the additional capability of being executed as a stand-alone application. Once loaded, the application may be executed at start-up of the operating system by inclusion of a shortcut in the "Start-Up" folder in the Windows directory, or by the modification of the "win.ini" file. The application then downloads and configures appropriate software without the need for user intervention.

It involves transferring an executable image (e.g., application) from the basic input output system (BIOS) of the system onto the hard disk or other mass media storage device of the system. The application, or an obtained replacement of the application, is executed every time the operating system starts, without user intervention. The transferred image is referred to in this document as the Internet Start-Up Application (ISUA). The application facilitates the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

Two software modules are used in various embodiments of the system. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), that will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289, entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_M$. If a plurality of computers is used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
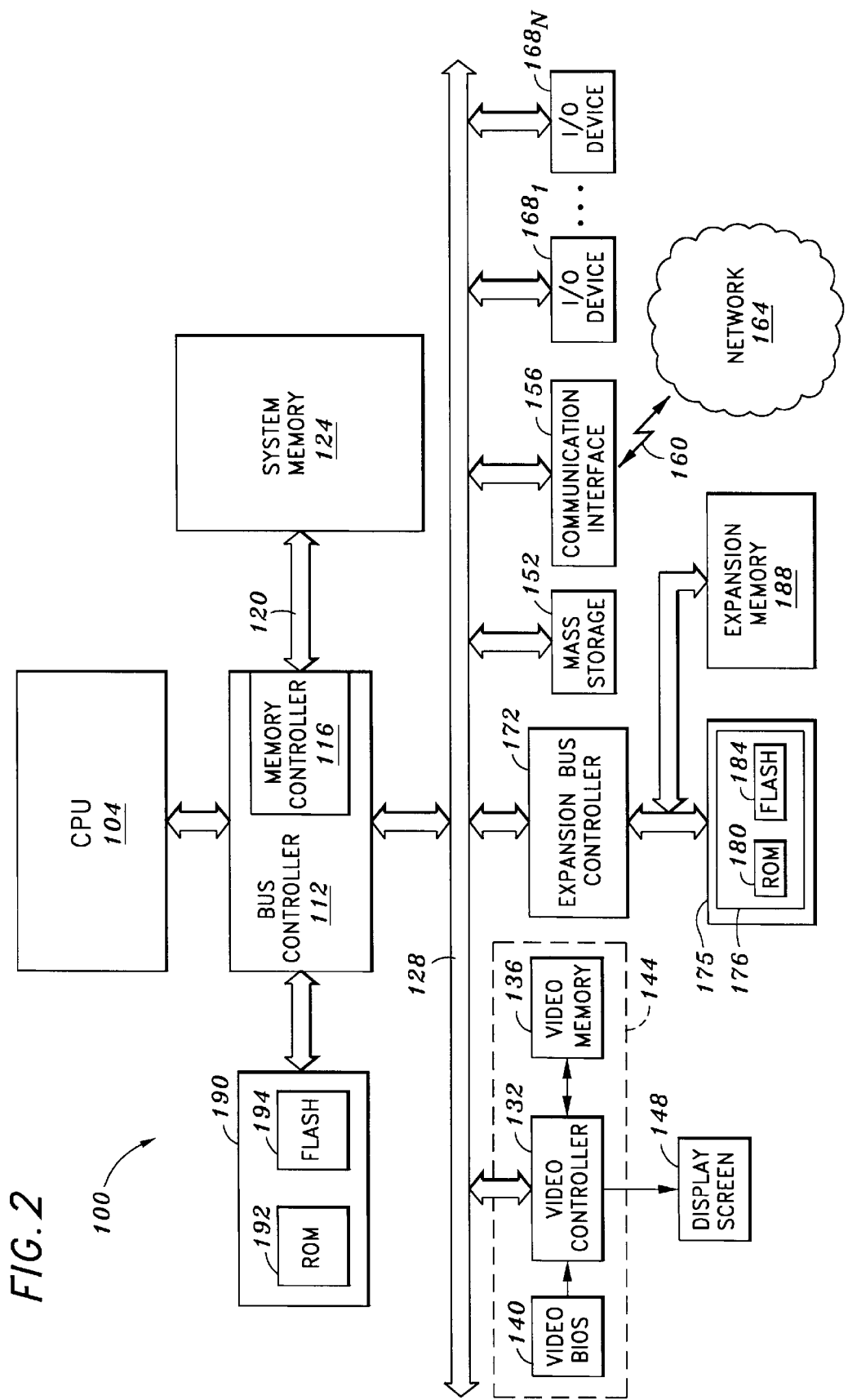
FIG. 2 illustrates an exemplary processor system or user computer system that may implement embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680x0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O device $168_1$–$168_N$ may be a disk drive, such as a compact disk drive, a digital disk drive, a tape drive, a zip drive, a jazz drive a digital video disk (DVD) drive, a solid state memory device, a magneto-optical disk drive, a high density floppy drive, a high capacity removable drive, a low capacity media device, and/or any combination thereof. The expansion bus controller 172 is coupled to nonvolatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84, ISUA 86, and initial payload 88a may each be separately developed and stored in the system firmware 176 prior to initial use of the computer system 100. In one embodiment, the RAPI 84, ISUA 86, and initial payload 88 each includes proprietary software developed by Phoenix Technologies, Ltd. RAPI 84 provides a secure interface between ROM application programs and system firmware 176. One embodiment of RAPI 84 is described in co-pending U.S. patent application Ser. No. 09/336,889, entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289, entitled "Method and Apparatus for Automatically Installing and Configuring Software on a Computer," filed on Jun. 18, 1999, assigned to Phoenix Technologies, Ltd., and which is incorporated herein by reference.

Figure 4A:
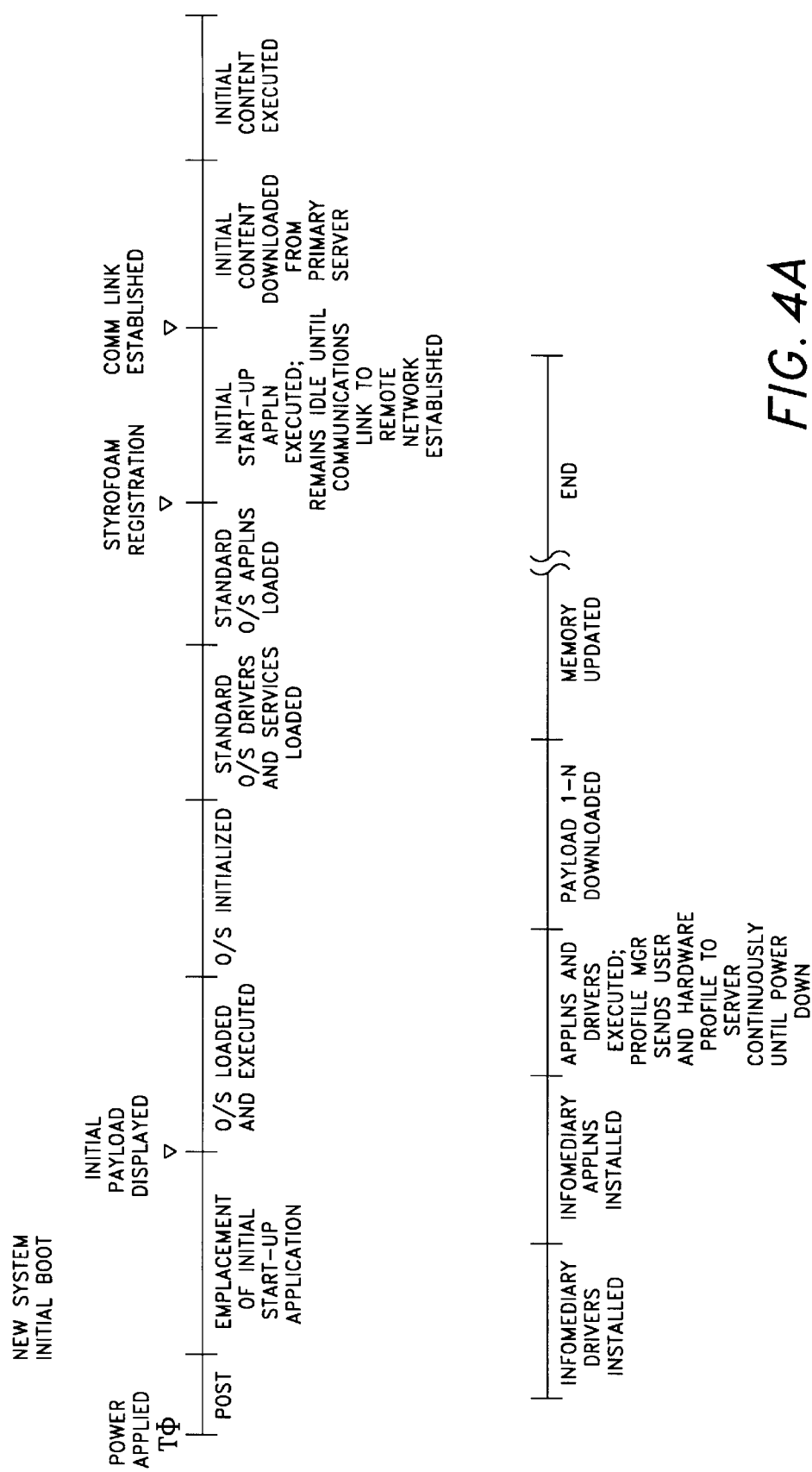
FIG. 4 illustrates one embodiment of a process flow chart provided in accordance with the principles of the invention.
Figure 4B:
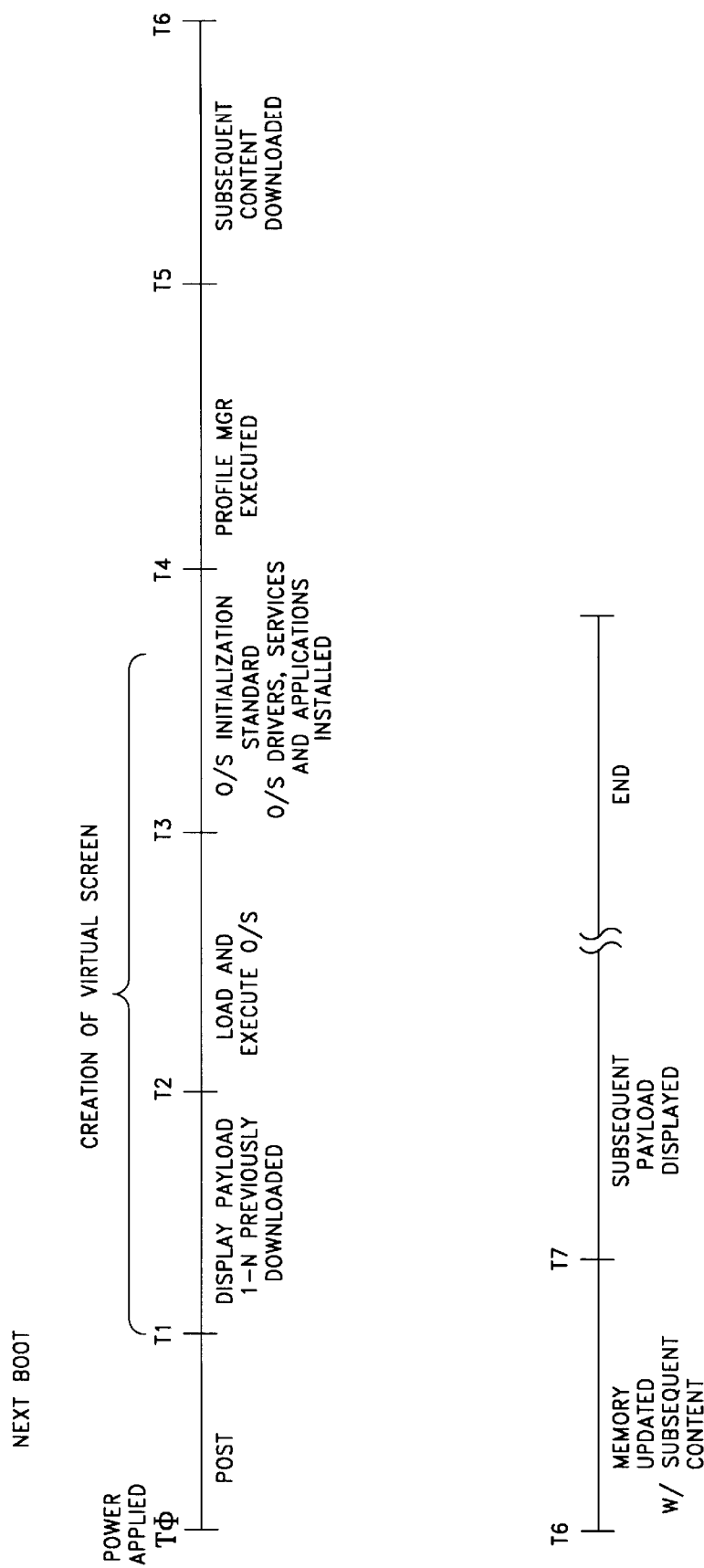

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067, entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. patent Continuation-in-Part application Ser. No. 09/272,859, entitled "Method and Apparatus for Providing Memory-Based Device Emulation" filed on Jun. 18, 1999, and in co-pending U.S. patent application Ser. No. 09/336,281, entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62a, drivers 62b, and payloads 62c. In one embodiment, the applications 62a include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users that have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88b. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003, entitled "Displaying Images during Boot-up and Shutdown" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory.

Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

Figure 5:
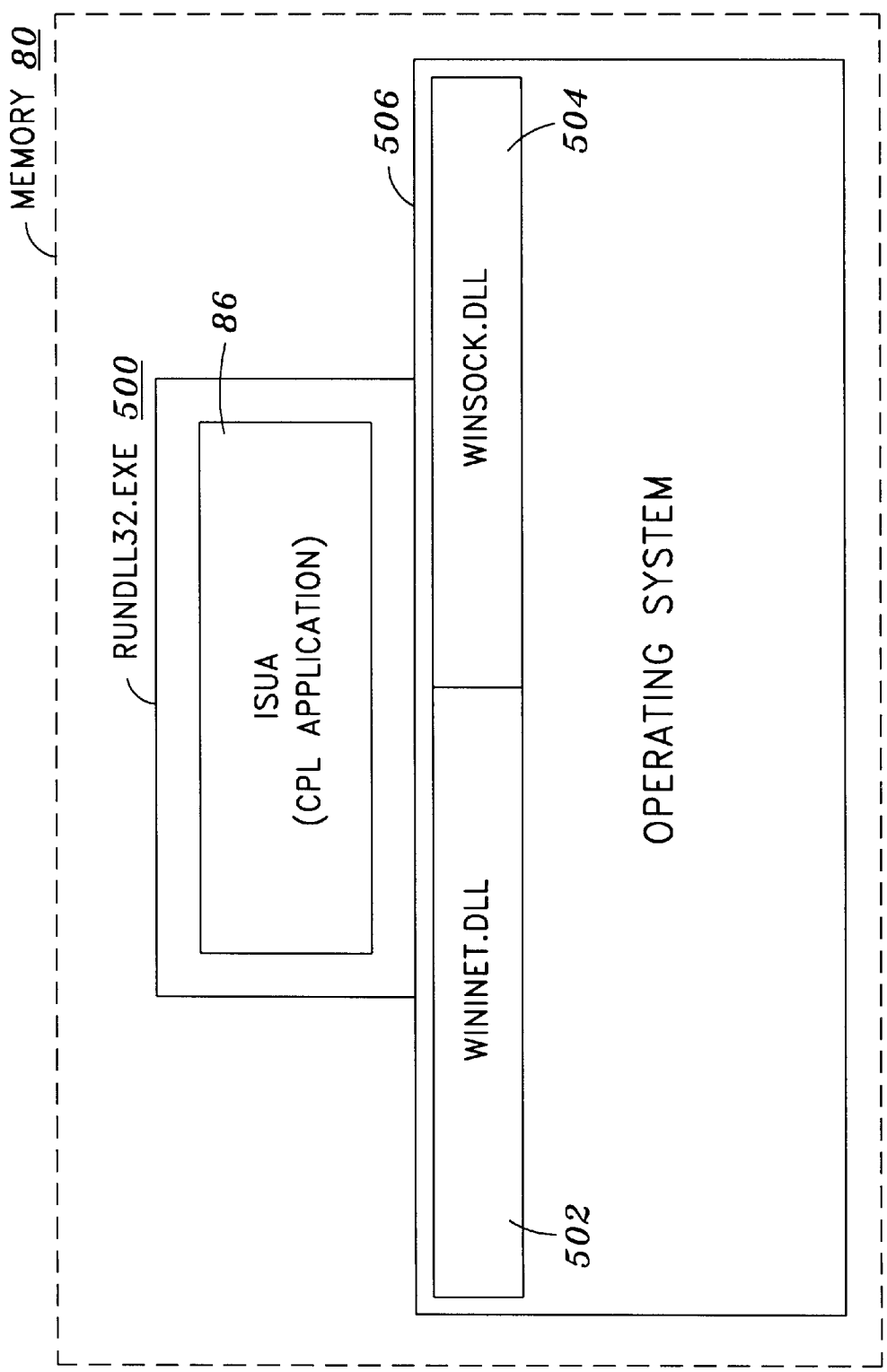
FIG. 5 illustrates a block diagram of one embodiment of a memory contained in the computer system configured in accordance with the principles of the invention.

FIG. 5 is a block diagram illustrating one embodiment of the integration of the ISUA 86 with the other components of software that is necessary for the ISUA 86 to function properly. As seen in FIG. 5, the ISUA 86 is executing in the memory space of a rundll32.exe application 500. Rundll32.exe application 500, in turn, functions above an operating system 506, which in this embodiment is a Microsoft Windows 98™ operating system. As part of the functionality provided by the operating system 506, a wininet.dll 502 and a winsock.dll 504 is contained in operating system 506. Together, wininet.dll 502 and winsock.dll 504 provide the network functionality required by ISUA 86.

Figure 6:
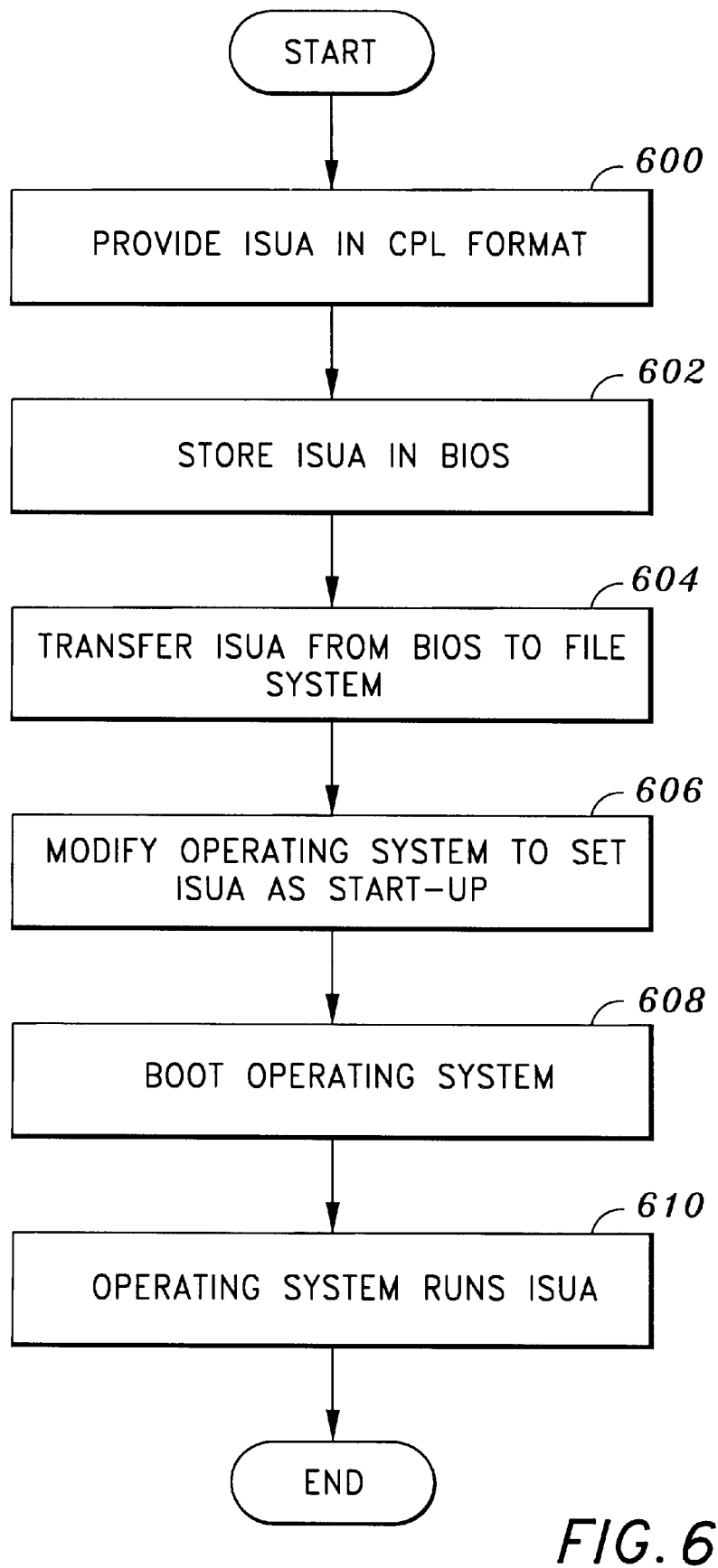
FIG. 6 illustrates a flow diagram detailing one example of the development process of the smaller Microsoft Windows application performed in accordance with the principles of the invention.

FIG. 6 is a flow diagram of an exemplary process of operation performed in accordance with the principles of the invention.

In block 600, the ISUA 86 is created in a CPL format. Thus, the ISUA 86 may be compiled using any compiler to generate a CPL formatted executable. Of course, the ISUA 86 may be provided to the system as a pre-compiled CPL formatted executable.

In block 602, the ISUA 86 is stored in BIOS 82. In one embodiment, an image of the ISUA 86 is included in a larger image, which is then stored in the BIOS 82 through a flash process. In another embodiment, the image of the ISUA 86 is stored independently of the other contents of the BIOS 82.

In block 604, the ISUA 86 package is copied from the BIOS 82 onto mass storage device 152. In one embodiment, the ISUA 86 package is initially compressed and is decompressed as it is being transferred into mass storage device 152. In alternate embodiments, the ISUA 86 is transferred directly and optionally decompressed at a later time. The ISUA 86 package may also be encrypted such that a decryption machine needs to be present in order to decrypt the ISUA 86 package. After the ISUA 86 package has been transferred to mass storage device 152, operation will continue with block 606.

In block 606, the ISUA 86 is set to be a start-up application. Thus, the ISUA 86 will be called after the operating system contained on the user system 40 has completed booting. Different approaches may be taken in setting the ISUA 86 to start-up automatically upon the completion of the boot of the operating system depending on the actual version of the operating system. Under Windows 95™ or Windows 98™, CPL programs must be located outside "Start Menu" folder. This includes all directories under the "Start Menu" folder. If CPL files are put under the startup folder, they are ignored and thus disabled. In order for the Windows 95™ or Windows 98™ operating system to auto-start the ISUA 86, a shortcut for the program can be created and put into the startup folder. As an alternative, the win.ini file under the "Windows" directory (or the directory under which the operating system is installed) may also be modified to include a "run=" entry for the CPL program. When the operating system boots up, it will auto-start every program and shortcut under the startup folder, plus the programs specified in the win.ini file. Under Windows NT™, CPL programs can be put in Windows™, startup folder directly. The operating system will identify the files based on the system registry, and launch the programs automatically when Windows comes up. There is no need for the creation of an operating system shortcut. Operation then continues with block 608.

In block 608, control will be returned to the operating system to continue boot-up and initialization of the computer as normal.

In block 610, the operating system loads, or runs, ISUA 86 as a startup application, which allows ISUA 86 to function as described below.

FIG. 7 is a flow diagram of one embodiment of the ISUA 86 after the operating system has been loaded and the ISUA 86 has been loaded.

In block 700, the network connection detector 502 of ISUA 86 performs a poll to detect if an Internet or necessary network connection exists. The network connection detector 502 may determine if a necessary network connection exists by querying the operating system or by pinging the primary server that contains the initial content package 62 to see if the primary server is available. In alternate embodiments, network connection detector 502 may attempt to contact a list of servers until one of the servers responds. If a network connection exists, then operation will continue with block 702. Otherwise, operation will continue with block 704.

In block 702, if network connection detector 502 does not detect a network connection, it will wait for a delay time and then return to block 700. In one embodiment, the delay is 10 seconds.

If, in block 700, the network connection detector 502 has detected a necessary network connection exists, then in block 704, network connection detector 502 checks to see how much bandwidth the user is using. This is to determine if there is sufficient bandwidth available to the ISUA 86 for transferring information without noticeably affecting the user's use of the bandwidth. Preferably, the user would not be aware that there is bandwidth use by the ISUA 86. In one embodiment, the network connection detector 502 may use heuristics in analyzing the bandwidth that is being used and the time that it has been in use to determine if it is appropriate for the ISUA 86 to use the connection. For example, the network connection detector 502 may wait until the user has only used less than 50% of the bandwidth for five minute before the ISUA 86 begins to use the connection. In another embodiment, a predetermined threshold may be used to determine if bandwidth is available for use by ISUA 86. Thus, for example, if the amount of connection bandwidth that is being consumed by other processes is only 10% of the total bandwidth, then there is deemed to be sufficient bandwidth available for use by the ISUA 86. The amount of bandwidth that is used by the ISUA 86 may be based on a simple ratio or some mathematical relationship between the bandwidth used by the user or the bandwidth that is to be used by the ISUA 86. If the bandwidth is available for use, then operation will continue with block 706. Otherwise, operation will continue with block 710.

In block 706, the download module 504 of the ISUA 86 will download a data chunk of the WDL 62a in one transfer instead of performing separate downloads of each portion of data of the WDL 62a.

In block 708, the download module 504 will determine if the WDL 62a has been completely downloaded. If the WDL 62a has been completely downloaded, then operation will continue with block 716. Otherwise, operation will return to block 700.

In block 716, once download module 504 has determined that the WDL 62a has been completely downloaded, download module 504 will verify the completeness and integrity of WDL 62a. For example, download module 504 may perform a checksum operation on the downloaded WDL 62a to determine if an error was encountered during downloading. If the WDL 62a is verified, then operation will continue with block 712. Otherwise, operation will continue with block 718.

In block 712, once the WDL 62a has been verified, then URL/shortcut module 506 install shortcuts to any applications such as set-up/sign-up programs for Internet service providers or links to web sites. In one embodiment, WDL 62a is also executed immediately to start performing its tasks. In addition, once the WDL 62a has been verified, WDL 62a will be executed by the operating system as a start-up application. After URL/shortcut module 506 has altered the shortcut, operation then ends.

In block 718, if the WDL 62a has not been verified in block 716, then the download module 304 will remove the WDL 62a from mass storage device 152. Operation then continues with block 700, where the network connection detector 502 again polls to detect if a necessary network connection exists.

In one embodiment, once the ISUA 86 is finished with its pre-internet connection job (including downloading, installing and launching the WDL 62a), the ISUA 86 has finished everything it needs to do. The WDL 62a will take over for the ISUA 86 from this point on. Once the WDL 62a is active, one of the WDL 62a 62A's initial duties is to uninstall the ISUA 86.

The main function of the WDL 62a is to control data traffic between the computer system 100 and the server 22. In this way, the WDL 62a can be viewed as providing data exchange and transmission services to all the other components.

In one embodiment, the data exchange duties that the WDL 62a performs are the based on the same functionality that is provided by the ISUA 86 as described in FIG. 7 in transferring the WDL 62a. Thus, the WDL 62a provides for detecting if an usable connection exists (as it does not initiate Internet connections on its own) and, if a connection exists, limiting the transferring of data only to any available bandwidth so as not to impinge on other application's use of the bandwidth. The exception to the similarity of function of WDL 62a as compared to the ISUA 86 is that the functionality of WDL 62 are enhanced and added to for a more feature-rich and demanding environment.

In one embodiment, what has been added to WDL 62a is the ability to upload from the computer system 100 to the server 22. Any components that has been installed on the client, such as the profile manager application, needs to pass information such as user profile and user/advertisement metrics to the web server.

The download and upload functionality of the WDL 62a is now as follows:

1. It will have the feature of "internet connection time-sharing" where only periods of inactivity will be used to download and upload data.
2. It will be able to construct valid data modules from partial downloads and re-send unsuccessful uploads. That is, if the WDL 62a does not have enough idle connect time in one Windows session to exchange a data module or a set of data modules, it will start where it left off from when idle connection time is available again.

The WDL 62a only handles data exchange and dissemination. Unlike the ISUA 86, which handled providing basic OS content (e.g., shortcuts), the WDL 62a does not handle the actual provision of content or change to the user interface. The WDL 62 is solely used as data traffic coordinator.

Initialization

Once the WDL 62a is installed and running in the OS, the WDL 62a:

1. Uninstalls the ISUA 86.
2. Downloads various application components. These include:
   User Query Application
   Content Manager
   Profile Manager
   ROM Flasher
3. Wait for an internet connection.

In one embodiment, the first component downloaded is the user query application. This component will be launched right away even while the rest of the components continue to be downloaded.

Every Windows Session

In a "regular session" and when no Internet connection is present, the WDL 62a's responsibility is to wait (or sniff) for Internet connection. It does this indefinitely until it can successfully connect. Once any Internet connection is made, it detects periods of inactivity between normal connect time and uses those time-slices to check for and transfer:

1. End-user and ad metrics;
2. End-user(s) profile(s);
3. User content and user content instructions;
4. Ad content and ad content instructions;
5. Updates for OS components, which include Content Manger, Profile Manager, and ROM Flasher;
6. Updates for ROM components, which include the ISUA 86, and the ROM Client Loader (these would be presented to the ROM Flasher); and,
7. Other custom applications as added.

The data exchange functionality of WDL 62a is able to construct valid data modules from partial downloads and uploads, and that a download batch may not finish in on connect, one Windows session, or even in one day. WDL 62a determines when each piece of data is complete and ready for another component to act upon.

Possible Reincarnation

Although the WDL 62a is meant to live on forever, it is possible that the end-user could delete the WDL 62a. It is the responsibility of the ROM Client Loader (RCL) to check if either the ISUA 86 or the WDL 62a is still installed in Windows. If it finds that neither exists, the RCL will re-deploy the ISUA 86 so that the ISUA 86 can do its job all over again, which for what we are concerned about, is to download, install, and launch the WDL 62*a* again. In one embodiment, if the user had previously answered "no" to User Query Application of whether the user wanted any components to be installed or not, a CMOS bit would be set and the RCL would not re-deploy the ISUA 86. There are exceptions to this, which are covered below.

Internet Connection Detector (Sniffing For a Connection)

As noted, in a "regular session" and when no Internet connection is present, the WDL 62*a* waits (or sniffs) for an Internet connection. WDL 62*a* does this indefinitely until it can successfully connect. Once any Internet connection is made, WDL 62*a* detects periods of inactivity between normal connect time and use those time-slices to check for and download components the server 22 wants to give the client. The Internet Connection Detector module (not shown) runs in the background and wait for a connection at a specified interval of time. Once a connection has been established the transfer (upload/download) functionality is invoked.

Data Exchange (Download/Upload) Intelligence

Once the Internet Connection Detector module has determined that an internet connection is present, the WDL 62*a* starts detecting periods of inactivity between normal connect time and use those time-slices to download components/data and upload data.

The information as to what to download comes from the server 22. WDL 62*a* simply queries the server 22, and based upon what it already knows about the client machine (e.g., computer system 100), the profile(s) of the user(s), queued up end-user content, and queued up advertiser's content, the server 22 proceeds to send data to the client machine. Upload requests are sent to the WDL 62*a* by installed and running components when they have something to upload. WDL 62*a* may also download data from other servers, as described herein.

Reconstructing Data From Partial Downloads

With a large amount of data being sent across the wire in the idle moments of a regular internet connection session, it is very possible for that batch of data not to finish in one connect, one Windows session, or even in one day.

If the WDL 62*a* detects the loss of the connection for any reason, it will return to wait-for-connection (sniff) mode. Once connected again, it will try to resume download from where it left off. This implies the download functionality of WDL 62*a* is able to construct valid data modules from partial downloads. It achieves this by keeping track of the last successful data packet sent then asking the server 22 for the next packet in the series.

Once the WDL 62*a* determines a piece of data is complete and ready for another component to act upon, it notifies the appropriate component.

Download Sequence of Events

The events that take place once an idle-time in a regular Internet connection session is detected are:

1. The IP address of the server to be contacted (e.g., server 22) is obtained from information stored in the WDL 62*a*'s data area (not shown), which is a section of mass storage device 152;
2. A connection is made the server to be contacted using this IP address;
3. The WDL 62*a* notifies installed components it has a connection;
4. Installed components request the WDL 62*a* to upload data on their behalf (e.g., the Content Manager may request upload of end-user and ad metrics and the Profile Manager may request upload of its end-users profiles).
5. The WDL 62*a* sends a request to check for content updates to download, the web server responds with the data, and, once downloaded by the WDL 62*a*, the WDL 62*a* notifies the component of its arrival (e.g., the Content Manager may receive user content and user content instructions and Ad Content and Ad Content Instructions);
6. The WDL 62*a* sends a request to check for component updates to download, the web server responds with the new update, and, once successfully downloaded by the WDL 62*a*, the WDL 62*a* installs the update (e.g., updates may include OS components such as: Content Manger, Profile Manager, ROM Flasher, OEM applications, and WDL 62*a* itself; and ROM components updates may include: ISUA 86 and ROM Client Loader—these updates would be presented to the system BIOS ROM Flasher; and,
7. The WDL 62*a* returns control to the original internet connector (usually a web browser).

Interaction with other components

Notifying components of data availability is one of the services of the WDL 62*a*. After downloading content (e.g., data and instructions), WDL 62*a* needs to know which installed component to notify that new data has arrived. This is a design implementation issue, but in one embodiment, each installed component registers with the WDL 62*a*. Registering would imply that the component has given the WDL 62*a* everything it needs to know to act on its behalf. This includes:

1. Adding to the WDL 62*a*'s Component and Data List, contained in the WDL 62*a*'s data area so that WDL 62*a* can check the web server for updates;
2. The method for identifying the component's data;
3. The method to launch or notify the component that its data is available; and,
4. The method for forwarding data from the component to the web server Installing and Launching Downloaded Components After updated and new components are downloaded from a server, WDL 62*a* installs them. In one embodiment, these components are executable Windows applications and all component have a standard way to be installed. The standard may be as simple as expecting a single self-extracting, self-installing executable.

Registration

The WDL 62*a* needs to give some indication of its existence so that the ROM Client Loader (RCL) can check during each boot whether it is still installed or not; since it is possible that the end-user will delete it. The RCL would then re-deploy the ISUA 86, which in turn will eventually download, install, and launch the WDL 62*a* again. In one embodiment, the indication is achieved by checking the Windows registry against where the WDL 62*a* is actually located.

User Query Application

After the ISUA 86 has done its job, the WDL 62*a* takes over. The first component that the WDL 62*a* downloads from the server 22 is the User Query Application. This is the first time the user is asked whether the user would like to receive the benefits of the system. If the user declines, the WDL 62*a* executes the follow tasks:

1. Stops downloading additional components (which may be happening in the background);
2. Removes those downloaded components, whether they are partially or wholly downloaded;
3. Notifies the ROM Client Loader (in the system ROM) that once the WDL 62*a* is removed, it should re-install the ISUA 86, which in turn would eventually download the WDL 62a. The notification may be done by setting a CMOS bit or via some other method; and, 4. The WDL 62a uninstalls itself.

There are potentially a few ways the ISUA 86 (which eventually initiates the installation of all other components) may be re-deployed to Windows by the ROM Client Loader (RCL) after the end-user answers "no". Several possibilities exist:

1. Upon re-installation of a new copy of Windows;
2. Upon re-installation of a new copy of Windows;
3. Upon re-installation of a new hard disk; or,
4. After a predetermined period of time (e.g., 6 months period) passes.

If any of these events occur, the RCL may give intelligence to the ISUA 86 to pass along to the WDL 62a. This intelligence is the fact that at one time in the past, User Query Application asked and the user declined the installation of the components of the system. Once the WDL 62a downloaded User Query Application, the User Query Application may be able to obtain this intelligence from the WDL 62a and ask another, hopefully less annoying and more provocative question.

In one embodiment, User Query Application dialogs should explain to the user all the features that will be offered if components are retrieved, such as automatic updating of system components and the like.

As the User Query Application has a user-interface, multi-language capabilities may be provided. The language implementation of Windows could be examined so that the User Query Application may automatically display the correct language. EFIGS (English, French, Italian, German, and Spanish) would most likely be required. Japanese and Mandarin may also be provided.

Although the present invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A method comprising:

creating an executable program in accordance with a Windows Control Panel Language (CPL) format;

storing the executable program in a first non-volatile memory;

transferring the executable program from the first non-volatile memory to a second non-volatile memory; and, configuring an operating system to start-up the executable program after the operating system has completed booting.

2. The method of claim 1 wherein a file size of the executable program is smaller than a smallest executable file size obtainable under the Microsoft Windows 95™ or later operating systems.

3. The method of claim 1 wherein storing the executable program in the first non-volatile memory comprises storing the executable program in a basic input output system (BIOS) device.

4. The method of claim 3 wherein the BIOS device is one or more of the following: an electrically erasable read only memory device, read only memory device, and flash device.

5. The method of claim 3 wherein transferring the executable program comprises transferring the executable program from the BIOS device to a mass storage.

6. The method of claim 1 wherein configuring the operating system to run the executable program after the operating system has completed booting comprises creating a shortcut for the executable program, and storing the shortcut in a startup folder.

7. The method of claim 1 wherein configuring the operating system to run the executable program after the operating system has completed booting comprises modifying an initialization file to include a reference to the executable program.

8. The method of claim 7 wherein configuring the operating system to run the executable program after the operating system has completed booting comprises modifying a win.ini file to include a reference to the executable program.

9. The method of claim 1 wherein configuring the operating system to run the executable program after the operating system has completed booting comprises placing the executable program in the startup menu.

10. The method of claim 1 wherein said executable program includes:

determining whether an Internet connection is present;

if the Internet connection is present, determining whether a predetermined amount of bandwidth of the Internet connection is available;

if at least the predetermined amount of bandwidth is available, transmitting, in the background, a request to a remote server to download one or more files; and receiving the one or more files from the remote server.

11. The method of claim 10 wherein said executable program further includes storing the one or more files on mass storage.

12. The method of claim 10 wherein said one or more files include one or more of the following: an executable program, application program, payload, and driver program.

13. An apparatus, comprising:

a memory including one or more instructions; and a processor coupled to the memory, the processor, in response to the one or more instructions, to transfer an executable program created in accordance with a Windows Control Panel Language (CPL) format from a non-volatile memory to a second memory, and configure an operating system to start-up the executable program after the operating system has completed booting.

14. The apparatus of claim 13, wherein a file size of the executable program is smaller than a smallest executable file size obtainable under the Microsoft Windows 95™ or later operating systems.

15. The apparatus of claim 13, wherein the non-volatile memory includes a basic input output system (BIOS) device.

16. The apparatus of claim 13, wherein the non-volatile memory comprises one or both of the following: a read-only memory and a flash memory.

17. The apparatus of claim 13, wherein the memory comprises the non-volatile memory.

18. The apparatus of claim 13, wherein the second memory comprises a mass storage device.

19. The apparatus of claim 13, wherein the processor configures the operating system to start-up the executable program after the operating system has completed booting by performing one of the following;

storing a shortcut of the executable program in a startup folder;

modifying a win.ini file to include a reference to the executable program; and placing the executable program in a startup menu.

20. A computer program product, comprising:
- a computer usable medium having computer program code embodied therein to transfer an executable program created in accordance with a Windows Control Panel Language (CPL) format from a first device to a second device; and
- computer program code to configure an operating system to execute the executable program after the operating system has completed booting.

21. The computer program product of claim 20, wherein a file size of the executable program is smaller than a smallest executable file size obtainable under the 32-bit Microsoft Windows operating systems.

22. The computer program product of claim 20, wherein the first device comprises one or both of the following: a read-only memory and a flash memory.

23. The computer program product of claim 20, wherein the second device comprises a mass storage device.

24. The computer program product of claim 20, wherein said computer program code to configure said operating system to start-up the executable program after the operating system has completed booting comprises one of the following:
- computer program code to store a shortcut of the executable program in a startup folder;
- computer program code to modify an initialization file to include a reference to the executable program; and
- computer program code to place the executable program in a startup menu.

* * * * *